(12) United States Patent
Schmidt et al.

(10) Patent No.: US 9,766,101 B2
(45) Date of Patent: Sep. 19, 2017

(54) APPARATUS FOR DETERMINING OR MONITORING A PROCESS VARIABLE OF A MEDIUM IN A PIPELINE

(71) Applicant: Endress + Hauser GmbH + Co. KG, Maulburg (DE)

(72) Inventors: Robert Schmidt, Schopfheim (DE); Andreas Krumbholz, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 1 day.

(21) Appl. No.: 14/652,623

(22) PCT Filed: Dec. 6, 2013

(86) PCT No.: PCT/EP2013/075769
§ 371 (c)(1),
(2) Date: Jun. 16, 2015

(87) PCT Pub. No.: WO2014/095419
PCT Pub. Date: Jun. 26, 2014

(65) Prior Publication Data
US 2015/0338252 A1 Nov. 26, 2015

(30) Foreign Application Priority Data

Dec. 21, 2012 (DE) .......... 10 2012 113 046
Jan. 9, 2013 (DE) .......... 10 2013 100 158

(51) Int. Cl.
*G01D 11/24* (2006.01)
*G01F 1/66* (2006.01)
(Continued)

(52) U.S. Cl.
CPC .......... *G01D 11/245* (2013.01); *G01D 11/30* (2013.01); *G01F 15/18* (2013.01); *G01F 15/185* (2013.01); *Y10T 29/49004* (2015.01)

(58) Field of Classification Search
CPC .............. G01D 11/24; G01D 11/245
(Continued)

(56) References Cited

U.S. PATENT DOCUMENTS 4,438,955 A * 3/1984 Ryan ............... F16L 41/004
 285/189
6,658,944 B2 12/2003 Melnikov
(Continued)

FOREIGN PATENT DOCUMENTS

DE 3816867 C1 5/1989
DE 29721863 U1 3/1999
(Continued)

OTHER PUBLICATIONS

German Search Report, German PTO, Munich, DE, Jan. 22, 2013.
(Continued)

*Primary Examiner* — Lisa Caputo
*Assistant Examiner* — Jamel Williams
(74) *Attorney, Agent, or Firm* — Bacon & Thomas, PLLC

(57) ABSTRACT

An apparatus for determining or monitoring a process variable of a medium in a pipeline, which has a predetermined inner cross section, comprising a sensor and a T-shaped adapter. The adapter has a first portion and a second portion arranged essentially perpendicular to the first portion. The first portion has essentially the same inner cross section as the pipeline and the sensor is so arranged in the second portion that the end face of the sensor facing the medium is flush with the inner surface of the first portion of the adapter.

8 Claims, 5 Drawing Sheets

(51) Int. Cl.
*G01D 11/30* (2006.01)
*G01F 15/18* (2006.01)

(58) Field of Classification Search
USPC ............................................. 73/431; 285/189
See application file for complete search history.

(56) References Cited

U.S. PATENT DOCUMENTS

| | | |
|---|---|---|
| 6,895,823 B1 | 5/2005 | Herrmann |
| 9,000,784 B2 | 4/2015 | Eberheim |
| 2004/0182132 A1* | 9/2004 | Head ................... G01L 19/0007 |
| | | 73/23.2 |
| 2011/0056305 A1* | 3/2011 | Yamamoto .............. G01F 1/584 |
| | | 73/861.12 |
| 2014/0004002 A1 | 1/2014 | Platte |

FOREIGN PATENT DOCUMENTS

| | | |  | |
|---|---|---|---|---|
| DE | 19861074 A1 | 12/1999 | | |
| DE | 60100360 T2 | 5/2004 | | |
| DE | 102008054659 A1 | 6/2010 | | |
| DE | 102009020439 A1 | 11/2010 | | |
| DE | 102011013001 A1 | 6/2012 | | |
| EP | 1378272 A1 | 1/2004 | | |
| GB | 2400439 A * | 10/2004 | ............. | G01F 1/662 |
| WO | 2010002432 A1 | 1/2010 | | |
| WO | WO 2010002432 A1 * | 1/2010 | ............. | G01F 1/662 |

OTHER PUBLICATIONS

International Search Report, EPO, The Netherlands, Mar. 6, 2014.
English Translation of the International Preliminary Report on Patentability, WIPO, Geneva, CH, Jul. 2, 2015.

* cited by examiner

APPARATUS FOR DETERMINING OR MONITORING A PROCESS VARIABLE OF A MEDIUM IN A PIPELINE

TECHNICAL FIELD

The invention relates to an apparatus for determining or monitoring a process variable of a medium in a pipeline, wherein the pipeline has a predetermined inner cross section.

BACKGROUND DISCUSSION

Measuring apparatuses such as sensors, however, also adjusting apparatuses, such as, for example, valves, are widely applied in the foods and feeds industries. If the measuring apparatuses come in contact with such materials, they must, for understandable reasons, satisfy the highest of requirements as regards hygiene.

Potential lodging places for health endangering germs occur in the contact region with the medium especially at locations, where two components are connected with one another. An example is the location of installation of a sensor, respectively a measuring apparatus, in a pipeline. Especially critical in this connection are relatively narrow and small dimensioned, intermediate spaces, respectively gaps, since these can be difficult to clean. If a gap is present in the contact region between sensor and pipeline, the medium can penetrate in the gap; impurities can collect in the gap, and germs can grow. Such measuring apparatuses do not meet the requirements of foods standards, and are, consequently, not permitted for use in the foods field. Equally, they are not suitable for use in pharmaceutical applications.

SUMMARY OF THE INVENTION

An object of the invention is to provide an apparatus, which meets high hygienic requirements.

The object is achieved by an apparatus, which includes a sensor and a T-shaped adapter, wherein the adapter has a first portion and a second portion arranged essentially perpendicular to the first portion, wherein the first portion has essentially the same inner cross section as the pipeline and wherein the sensor is so arranged in the second portion that the end face of the sensor facing the medium is flush with the inner surface of the first portion of the adapter. The solution of the invention, on the one hand, prevents formation of a gap between the sensor and the pipeline, whereby, on the other hand, also a sufficiently good cleaning opportunity in the region of the end face, thus in the contact region of the sensor with the medium, is assured. The end face of the sensor becomes virtually an integral part of the inner surface of the first portion of the adapter.

In an advantageous further development of the apparatus of the invention, the pipeline has an essentially circularly shaped, inner cross section. Furthermore, the end face of the sensor facing the medium has essentially the same curvature as the inner surface of the pipeline.

In order that the apparatus of the invention meets highest hygienic requirements, a preferred embodiment provides that the end face of the sensor facing the medium is arranged gap-freely in the adapter.

The sensor is preferably a conductive or capacitive sensor. Likewise, the sensor can also be a temperature sensor, an ultrasonic sensor, e.g. for flow measurement, a sensor for analytical purposes, a conductivity sensor or some other kind of sensor.

In the case of a capacitive or conductive sensor, a first electrode, an electrode insulation, a second electrode, a guard and a guard insulation are provided. Alternatively, the capacitive or conductive sensor is composed of a first electrode, an electrode insulation, a guard and a guard insulation. In the case of this embodiment, the second electrode is formed by the adapter. Preferably, the electrode, respectively the electrodes, are/is composed of the same material as the pipeline and/or the adapter. Especially, the one or more electrodes are/is composed of stainless steel. In an advantageous embodiment, the adapter comprises a cast part.

Preferably, the apparatus of the invention is manufactured via a method having method steps as follows:
- the sensor is pressed into the second portion of the adapter in such a manner that the sensor has a predetermined excess protruding into the adapter relative to the inner cross section of the first portion;
- then by a machining method the excess of the sensor protruding into the adapter and/or the inner surface of the first portion of the adapter are/is so machined over that the inner cross section of the first portion of the adapter and the inner cross section of the pipeline are essentially equal.

After the apparatus of the invention is manufactured in the above described manner, it is integrated into the pipeline. Integration occurs via usual securement methods, e.g. welding, screwing, etc.

BRIEF DESCRIPTION OF THE DRAWINGS

The invention will now be explained in greater detail based on the appended drawing, the figures of which show as follows:

FIG. 1b is a second perspective view of the embodiment of the adapter of the invention shown in FIG. 1a;

DETAILED DISCUSSION IN CONJUNCTION WITH THE DRAWINGS

Figure 1A:
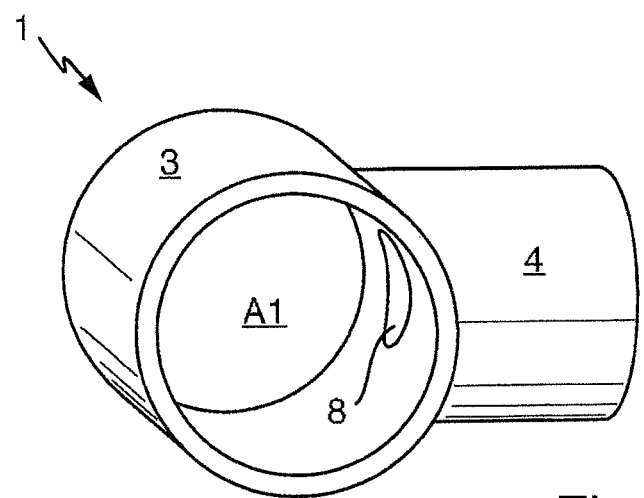
FIG. 1a is a first perspective view of a first embodiment of the adapter of the invention.
Figure 1B:
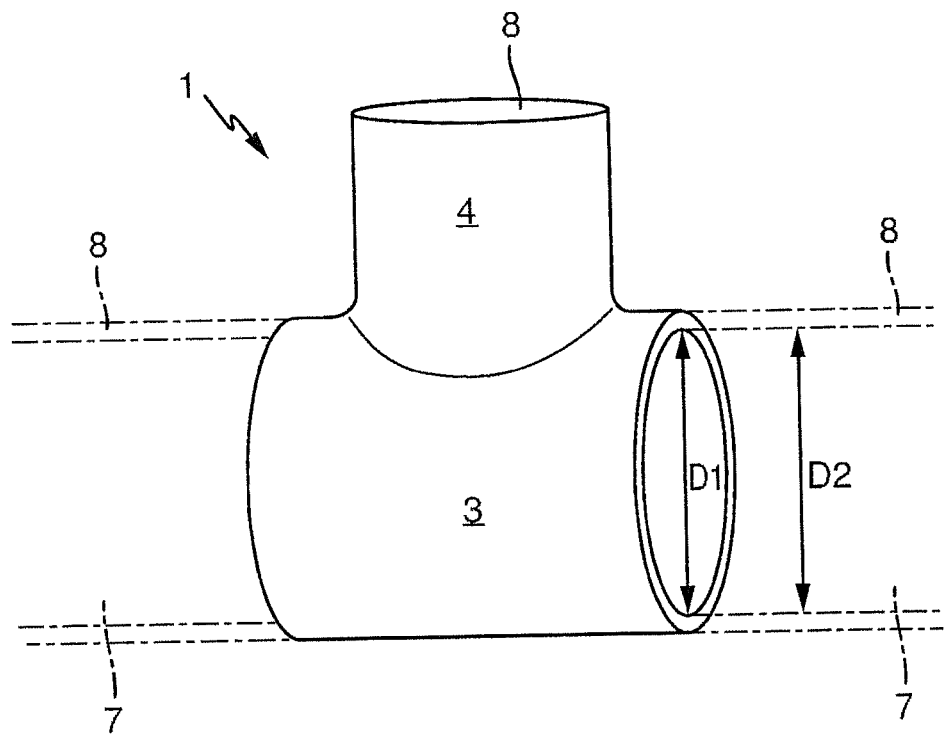

FIG. 1a shows a first perspective view of a first embodiment of the adapter 1 of the invention. FIG. 1b shows a second perspective view of the embodiment of the adapter 1 of the invention shown in FIG. 1a.

Adapter 1 is composed of a first tubular portion 3 and a second tubular portion 4 arranged essentially perpendicular thereto. Via the first portion 3, the adapter 1 is securable in a pipeline 7. Adapter 1 in the illustrated case is a T-piece. Adapter 1 is a cast part, a turned part or a milled part and serves, moreover, also as a process connection.

In the mounted state, a medium (not shown) is located in the pipeline 7 and in the first portion 3 of the adapter 1. The inner diameter D1 of the first portion 3 of the adapter 1 and the inner diameter D2 of the pipeline 7 are essentially equal, so that the medium can flow unimpeded. FIGS. 1a and 1b show the traversing opening 8 in the second portion 4 of the adapter 1. Opening 8 serves for accommodating the sensor 2.

Figure 2A:
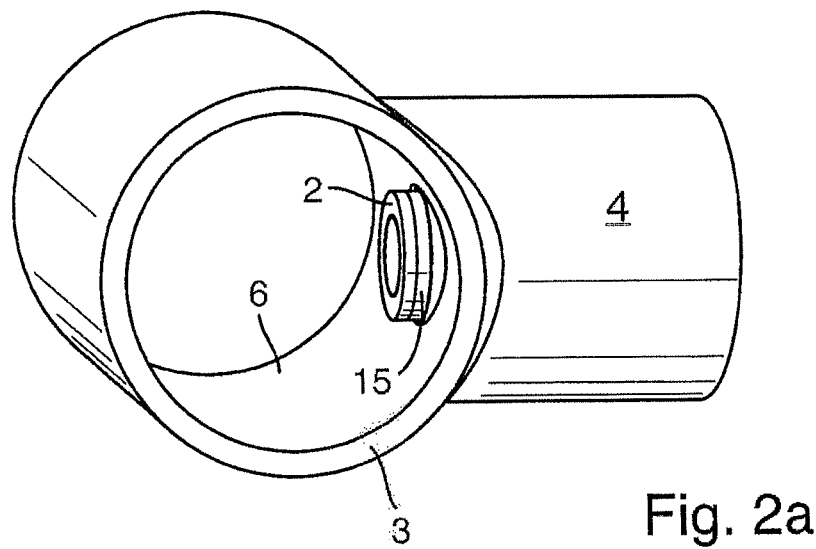
FIG. 2a is a perspective view of the apparatus of the invention illustrating the first manufacturing step.
Figure 2B:
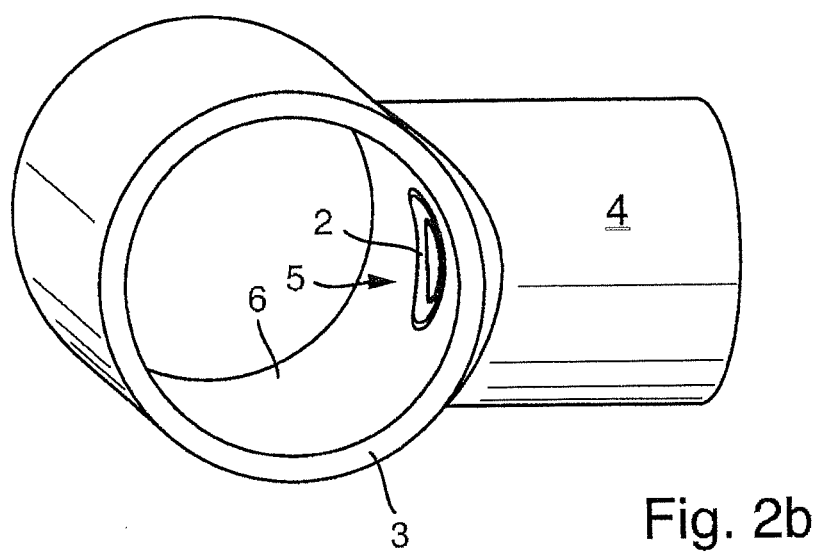
FIG. 2b is a perspective view of the apparatus of the invention illustrating the second manufacturing step.

FIGS. 2a and 2b are perspective views of the apparatus of the invention and illustrate the two manufacturing steps for manufacturing the apparatus of the invention. The sensor 2 is, as shown in FIG. 2a, so mounted in the traversing opening 2 in the second portion 4 of the adapter 1 that a defined excess 15 protrudes beyond the inner surface 6 of the first portion 3 of the adapter 1. The mounting of the sensor 2 in the second portion 4 occurs preferably via a press fit. In the illustrated case, the sensor 2 is a capacitive sensor.

In a second method step, the excess 15 of the sensor 2 protruding into the interior of the adapter 1 is removed by a machining method. Preferably, the first portion 3 of the adapter is internally completely machined over, respectively bored out, including the excess of sensor 2. Especially, the sensor 2 and/or the inner surface 6 of the first portion 3 of the adapter 1 are/is so machined over that the inner cross section A1 of the first portion 3 of the adapter 1 and the inner cross section A2 of the pipeline 7 are essentially equal. Therefore, the inner diameter of the first portion 3 before the second manufacturing step must, in given cases, be correspondingly less than the inner diameter D2 of the pipeline.

In the finally mounted state, the end face 5 of the sensor 2 is virtually an integral part of the inner surface 6 of the first portion 3 of the adapter 1. The solution of the invention has the advantage that the sensor 2 is arranged non-intrusively in the medium and is, thus, mounted flushly and gap-freely in the first portion 3 of the adapter 1. The mounted flush installation means that medium flowing in the pipeline 7 is not hindered. Since the installation is gap-free, so that there are no hollow spaces or dead spaces present, the solution is ideally suitable for hygienic applications.

Figure 3A:
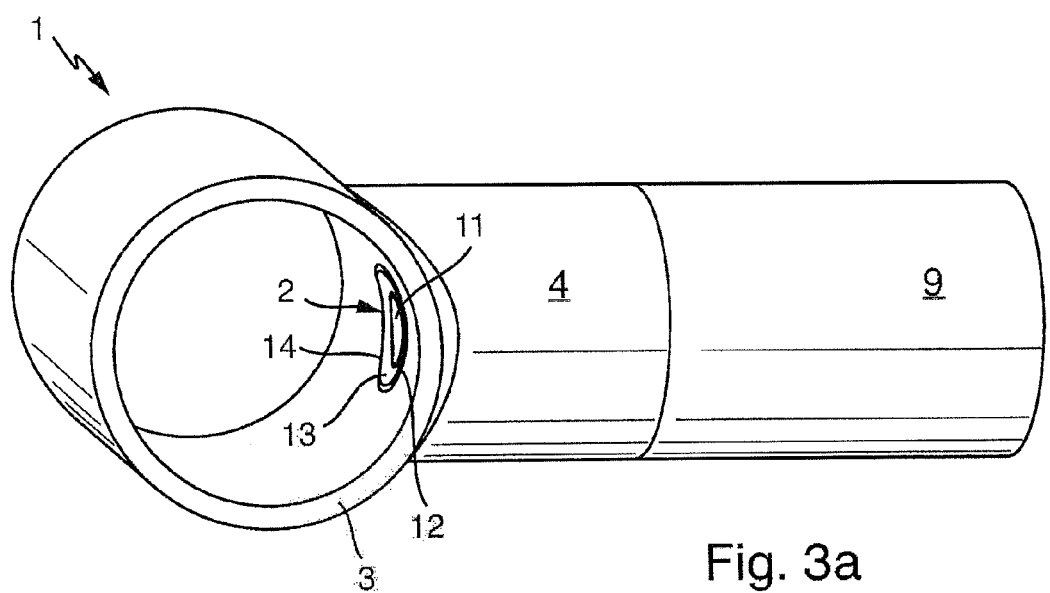
FIG. 3a is a perspective view of the embodiment of the apparatus of the invention shown in FIG. 2b plus electronics housing.
Figure 3B:
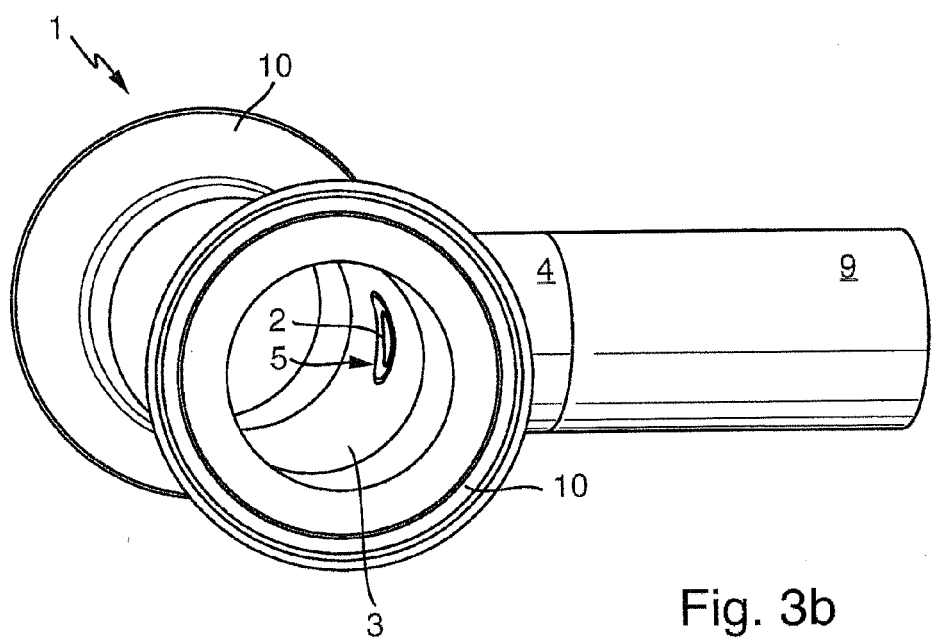
FIG. 3b is a first perspective view of a form of embodiment of the apparatus of the invention with electronics housing and clamp connections.
Figure 3C:
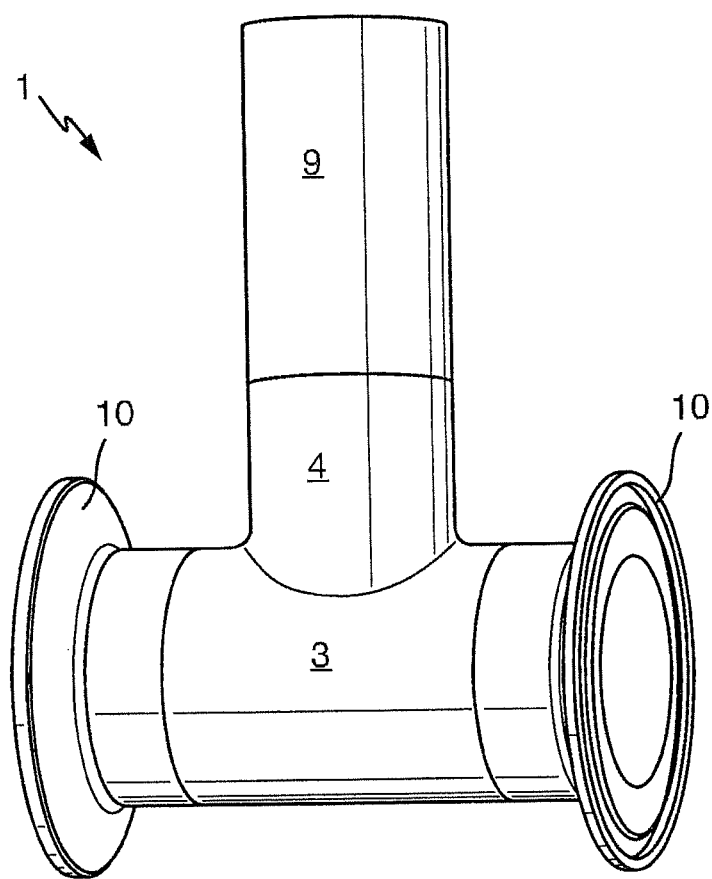
FIG. 3c is the form of embodiment shown in FIG. 3b in a second perspective view.

FIG. 3a shows the apparatus of the invention provided supplementally with an electronics housing 9. While the apparatus of the invention shown in FIG. 3a is welded into the pipeline 7, in the case of the embodiment shown in FIG. 3b, two clamp-adapters 10 are welded on the two ends of the adapter 1. The clamp-adapters 10 facilitate assembly of the apparatus of the invention into the pipeline 7, wherein corresponding clamp-adapters are provided on the pipeline 7. FIG. 3c shows the form of embodiment shown in FIG. 3b in a second perspective view.

Figure 4:
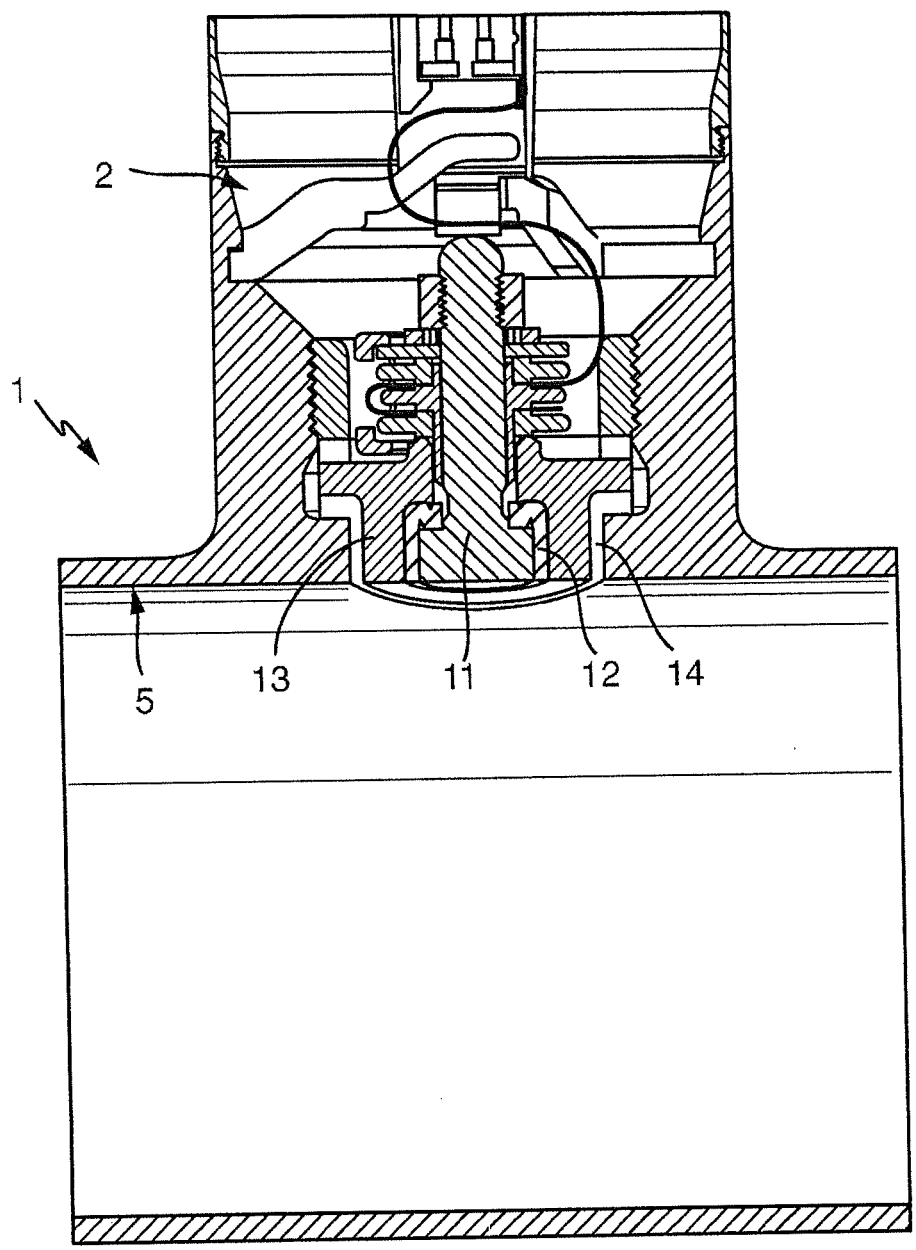
FIG. 4 is a cross section through the embodiment of the apparatus of the invention shown in FIG. 2b.

FIGS. 3a and 4 show an embodiment of the apparatus of the invention, in the case of which a capacitive sensor 2 is integrated in the adapter 1. As a result of the mutually matching inner-dimensions of the first portion 3 of the adapter 1 and the pipeline 7, adapter 1 represents virtually a portion of the pipeline 7. The capacitive sensor mounted flushly in the first portion 3 of the adapter 1 measures, especially, whether medium is located in the pipeline 7 or whether the pipeline 7 is empty.

The capacitive sensor 2 is composed of a centrally arranged, first electrode 11, which is insulated from a guard electrode 13 via an insulator 12. The insulator 12 and the guard electrode 13 surround the first electrode 11 concentrically. Preferably, the first electrode 11 is manufactured of the same material as the adapter, e.g. both are stainless steel. Via an additional insulator 14 arranged concentrically to the first electrode 11, the guard electrode 13 is insulated from the second electrode 15. The second electrode is in the illustrated case the adapter 1. Of course, in connection with the invention, all known embodiments of capacitive or conductive sensors can be applied.

The invention claimed is:

1. An apparatus for determining or monitoring a process variable of a medium in a pipeline, which has a predetermined inner cross section, comprising:
   a sensor; and
   a T-shaped adapter, wherein:
   said adapter has a first portion and a second portion arranged essentially perpendicular to said first portion;
   said first portion has essentially the same inner cross section as the pipeline; and
   said sensor is so arranged in said second portion that the end face of said sensor facing the medium is flush with the inner surface of said first portion of said T-shaped adapter;
   said pipeline has an essentially circularly shaped, inner cross section;
   and said end face of said sensor facing the medium has essentially the same curvature as the inner surface of the pipeline.

2. The apparatus as claimed in claim 1, wherein:
the end face of said sensor facing the medium is arranged gap-freely in said T-shaped adapter.

3. The apparatus as claimed in claim 1, wherein:
said sensor is one of: a conductive and capacitive sensor.

4. The apparatus as claimed in claim 3, wherein:
said capacitive or conductive sensor is composed of a first electrode, an electrode insulation, a second electrode, a guard and a guard insulation.

5. The apparatus as claimed in claim 3, wherein:
said capacitive or conductive sensor is composed of a first electrode, an electrode insulation, a guard and a guard insulation; and
a second electrode is formed by said T-shaped adapter.

6. The apparatus as claimed in claim 3, wherein:
said electrode/the electrodes is/are composed preferably of the same material as the pipeline and/or said T-shaped adapter.

7. The apparatus as claimed in claim 1, wherein:
said T-shaped adapter is a cast part.

8. A method for manufacture of an apparatus, comprising: a sensor; and a T-shaped adapter, wherein: said adapter has a first portion and a second portion arranged essentially perpendicular to said first portion; said first portion has essentially the same inner cross section as the pipeline; and said sensor is so arranged in said second portion that the end face of said sensor facing the medium is flush with the inner surface of said first portion of said T-shaped adapter, the method comprising the steps of:
   pressing the sensor into the second portion of the adapter in such a manner that the sensor has an excess protruding into the adapter relative to the inner cross section of the first portion;
   then by a machining method the excess protruding into the adapter and/or the inner surface of the first portion of the adapter are/is so machined over that the inner cross section of the first portion of the adapter and the inner cross section of the pipeline are essentially equal; and
   after mounting the sensor, the adapter is integrated into the pipeline.

* * * * *